(12) United States Patent
Terada et al.

(10) Patent No.: US 8,813,920 B2
(45) Date of Patent: Aug. 26, 2014

(54) BICYCLE BRAKE ARM

(75) Inventors: Takefumi Terada, Osaka (JP); Shinya Hirotomi, Osaka (JP); Tatsuya Matsushita, Osaka (JP); Kazuhito Minami, Osaka (JP); Tetsuya Kakimoto, Osaka (JP)

(73) Assignee: Shimano Inc., Osaka (JP)

( * ) Notice: Subject to any disclaimer, the term of this patent is extended or adjusted under 35 U.S.C. 154(b) by 343 days.

(21) Appl. No.: 13/184,671

(22) Filed: Jul. 18, 2011

(65) Prior Publication Data

US 2013/0020152 A1 Jan. 24, 2013

(51) Int. Cl.
*B62L 3/00* (2006.01)
*B62L 1/16* (2006.01)
*B60T 1/06* (2006.01)

(52) U.S. Cl.
CPC .... *B62L 1/16* (2013.01); *B60T 1/06* (2013.01)
USPC ...................................... 188/24.22; 188/24.12

(58) Field of Classification Search
USPC .............. 188/24.11–24.13, 24.21, 24.22, 2 D
See application file for complete search history.

(56) References Cited

U.S. PATENT DOCUMENTS

| | | | | |
|---|---|---|---|---|
| 4,388,848 A * | 6/1983 | Albert | | 83/666 |
| 5,411,280 A * | 5/1995 | Allsop et al. | | 188/24.22 |
| 5,417,311 A * | 5/1995 | Musco, III | | 188/24.21 |
| 5,503,252 A * | 4/1996 | Gelbein | | 188/24.22 |
| 5,819,880 A | 10/1998 | Ota et al. | | |
| 5,960,913 A * | 10/1999 | Kuo | | 188/24.19 |
| 6,349,799 B1 * | 2/2002 | Kariyama | | 188/24.22 |
| 7,802,660 B2 * | 9/2010 | Tsai | | 188/24.13 |
| 2008/0202866 A1 | 8/2008 | Caiazzo | | |
| 2011/0147137 A1 * | 6/2011 | Moore | | 188/24.22 |
| 2012/0125721 A1 * | 5/2012 | Edwards | | 188/24.12 |

FOREIGN PATENT DOCUMENTS

| TW | D121592 S | 3/2008 |
|---|---|---|
| TW | M384824 U1 | 7/2010 |

OTHER PUBLICATIONS

Shimano American Corporation; SI8FN0A-003-00General Safery Information BR-7900; Sep. 2010.
Office Action of corresponding Taiwanese patent application No. 101103798 dated Dec. 19, 2013.

* cited by examiner

*Primary Examiner* — Melanie Torres Williams
(74) *Attorney, Agent, or Firm* — Global IP Counselors

(57) ABSTRACT

A bicycle brake arm basically has a first branch and a second branch. The first branch includes a cable attachment structure. The second branch extends from the first branch. The second branch includes a brake shoe attachment structure. At least one of the first and second branches includes an interior cavity. The at least one of the first and second branches has a transverse cross-section in which the interior cavity is completely and continuously surrounded by an exterior surface of the bicycle brake arm.

20 Claims, 5 Drawing Sheets

US 8,813,920 B2

BICYCLE BRAKE ARM

BACKGROUND

1. Field of the Invention

This invention generally relates to a bicycle brake device. More specifically, the present invention relates to a bicycle brake arm for a bicycle brake device.

2. Background Information

Bicycles are typically provided with at least one brake device for stopping. Currently, a wide variety of bicycle brake devices are available. One of the most popular types of bicycle brake devices is a rim brake. Rim brakes are configured to apply a braking force to the wheel of a bicycle by pinching the rim of the wheel with a pair of brake shoes attached to a pair of brake arms. One well-known example of a rim brake is a caliper brake. Caliper brakes are also available in several configurations. For example, caliper brakes include a side pull type, a center pull type and a dual-pivot, side pull type. One example of a caliper brake is disclosed in U.S. Pat. No. 5,819,880.

Bicycles should be made as lightweight as possible, and all the parts of a bicycle should therefore be made as light as possible. This is true of bicycle brake devices as well. However, in designing a bicycle part, a balance is typically made between strength and weight reduction. One example of a caliper brake that is provided with a through hole for reduced weight is disclosed in U.S. Patent Application Publication No. 2008/0202866.

SUMMARY

One aspect is to provide a bicycle brake arm that is relatively lightweight as compared to a conventional bicycle brake arm.

In view of the state of the known technology, a bicycle brake arm is provided in accordance with a first aspect that basically comprises a first branch and a second branch. The first branch includes a cable attachment structure. The second branch extends from the first branch. The second branch includes a brake shoe attachment structure. At least one of the first and second branches includes an interior cavity. The at least one of the first and second branches has a transverse cross-section in which the interior cavity is completely and continuously surrounded by an exterior surface of the bicycle brake arm.

In this brake arm of the first aspect, the interior cavity is completely and continuously surrounded by an exterior surface of the bicycle brake arm. Therefore, the brake arm is provided with sufficient strength in a "twist direction" of the brake arm to prevent undesirable twisting of bicycle brake arm as compared to bicycle brake arms having a through opening such as disclosed in U.S. Patent Application Publication No. 2008/0202866.

Various objects, features, aspects and advantages of the bicycle brake arm will become apparent to those skilled in the art from the following detailed description, which, taken in conjunction with the annexed drawings, discloses two illustrative embodiments of a bicycle brake arm.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
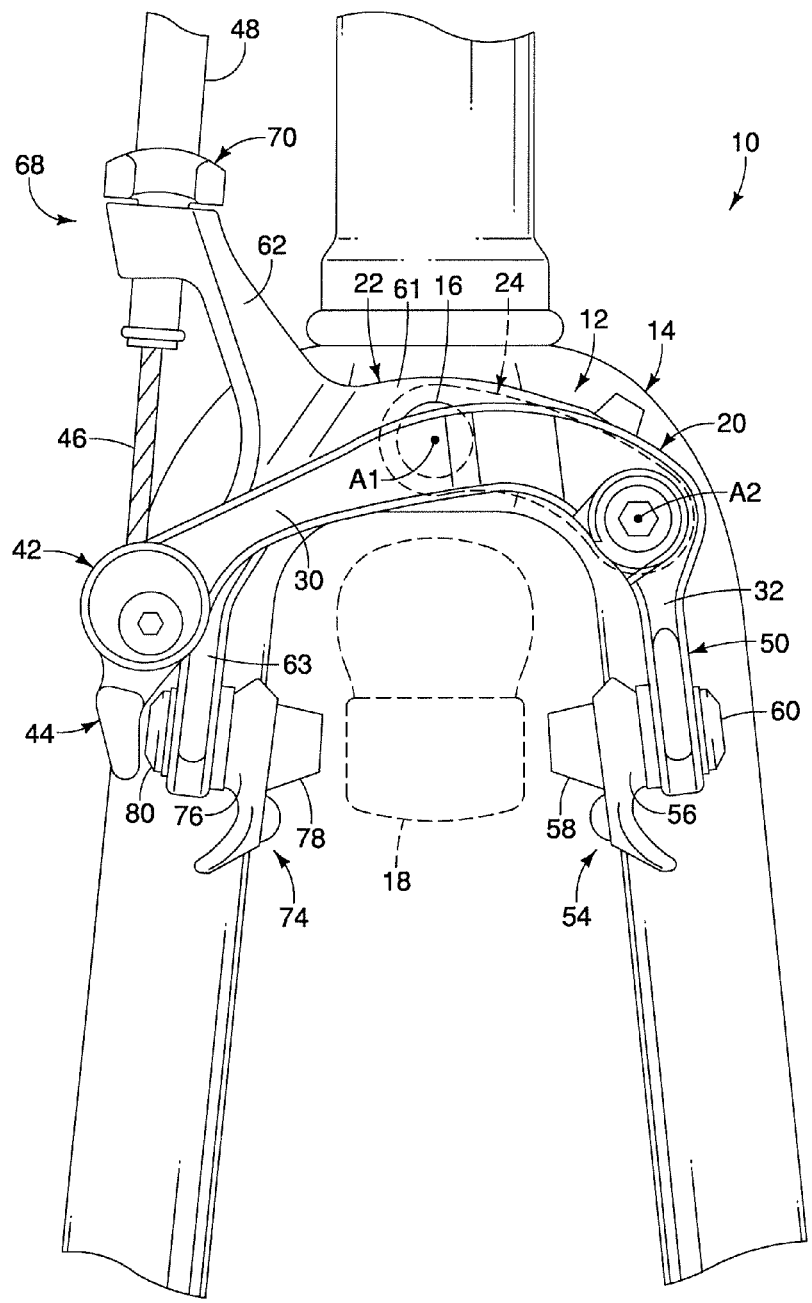
FIG. 1 is a front elevational view of a portion of a bicycle that is equipped with a bicycle brake device in accordance with the illustrated embodiments.

Referring initially to FIG. 1, a portion of a bicycle 10 is illustrated that is equipped with a bicycle brake device 12 in accordance with a first embodiment. The bicycle brake device 12 in the illustrated embodiment is a side pull caliper rim brake, and more particularly, a dual-pivot, side pull caliper rim brake. In particular, the bicycle brake device 12 is attached to a front fork 14 of the bicycle 10 via a mounting bolt 16 in a conventional manner. The bicycle brake device 12 is configured and arranged relative to front fork 12 for selectively gripping a bicycle rim 18 of the front wheel to applying a braking force using friction. Of course, it will be apparent from this disclosure that the bicycle brake device 12 can be mounted a rearward portion of the bicycle 10 for selectively gripping a bicycle rim of a rear wheel (not shown).

Figure 2:
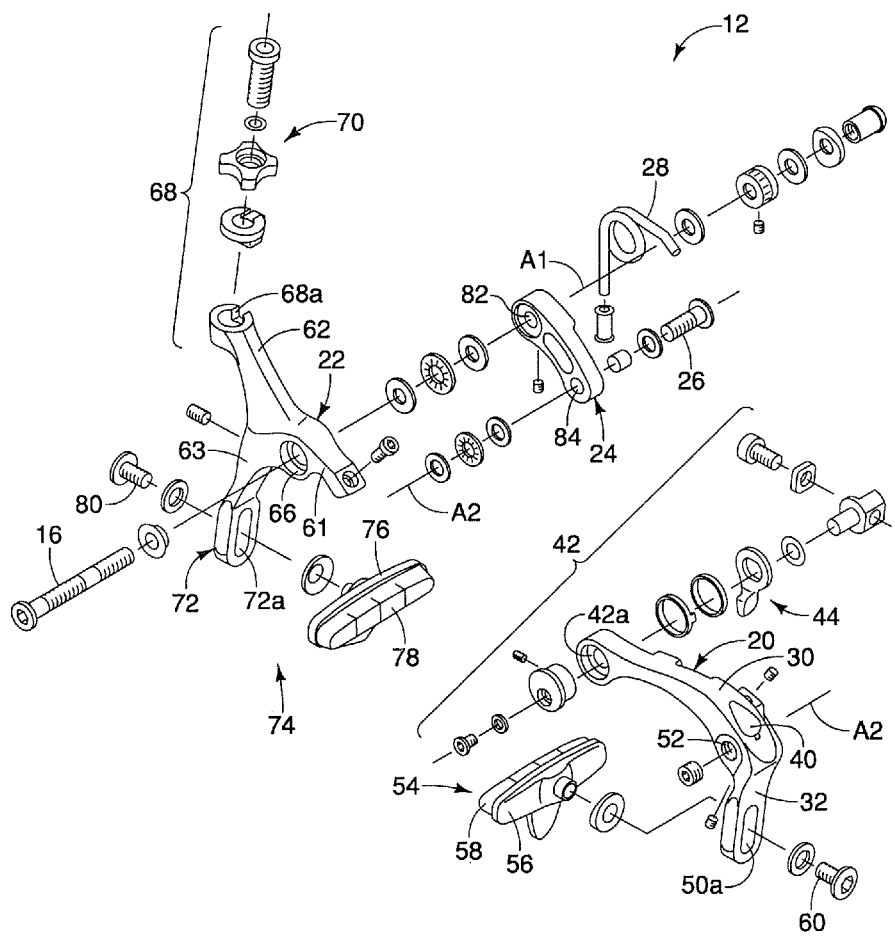
FIG. 2 is an exploded view of the bicycle brake device that is illustrated in FIG. 1.
Figure 3:
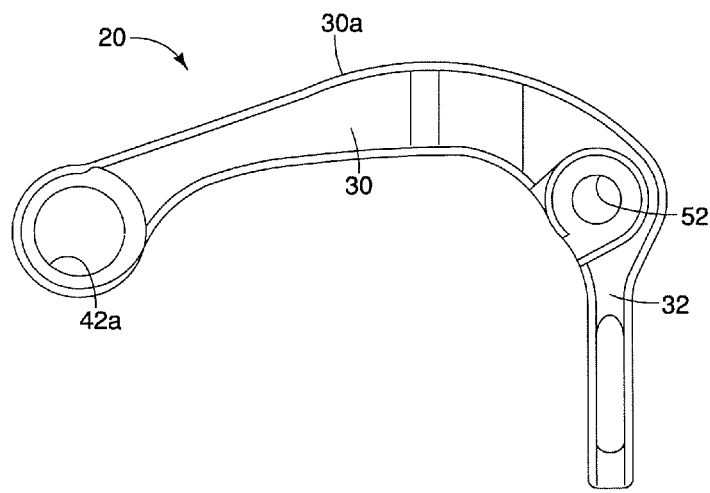
FIG. 3 is a front elevational view of one of the bicycle brake arms of the bicycle brake device that is illustrated in FIGS. 1 and 2.

Basically, as seen in FIGS. 1 and 2, the bicycle brake device 12 includes a first brake arm 20, a second brake arm 22 and a mounting arm 24. The first brake arm 20 is a generally L-shaped member, while the second brake arm 22 is a Y-shaped member. The first brake arm 20, the second brake arm 22 and the mounting arm 24 are rigid members formed of a suitable material such as a metallic material or a fiber reinforced plastic material.

The first and second brake arms 20 and 22 are pivotally supported relative to each other by the mounting arm 24. In particular, the second brake arm 20 is pivotally attached to the mounting arm 24 by the mounting bolt 16 that is also used to mount the entire bicycle brake device 12 to the bicycle 10. The center axis of the mounting bolt 16 defines a first pivot axis A1 of the bicycle brake device 12. The first brake arm 20 is pivotally attached to the mounting arm 24 by a support bolt 26 (FIG. 2). The center axis of the support bolt 26 defines a second pivot axis A2 of the bicycle brake device 12. Thus, a dual-pivot arrangement is provided in the bicycle brake device 12 of the illustrated embodiment. As seen in FIG. 2, a spring 28 is provided between the first and second brake arms 20 and 22 in a conventional manner for biasing the first and second brake arms 20 and 22 to their non-braking positions.

In the illustrated embodiment of FIGS. 1 and 2, except for the construction of the first brake arm 20. Thus, for the sake of brevity, the details of the construction of the bicycle brake device 12 will be omitted. In other words, other than the first brake arm 20, the construction of the bicycle brake device 12 will only be discussed briefly herein.

Figure 4:
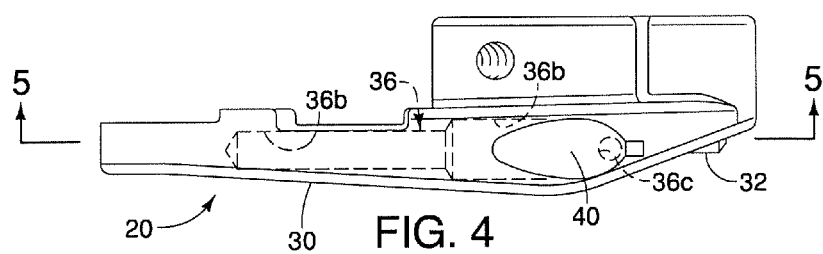
FIG. 4 is a top plan view of the bicycle brake arm that is illustrated in FIG. 3.
Figure 5:
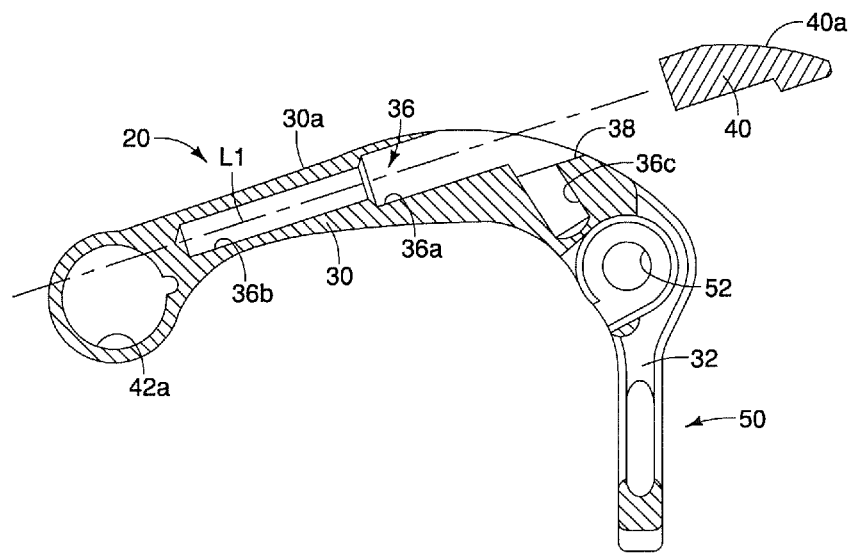
FIG. 5 is a cross-sectional view of the bicycle brake arm that is illustrated in FIGS. 3 and 4 as seen along the line 5-5, but with the cap or plug (e.g., a solid block) exploded outwardly from the interior cavity of the bicycle brake arm.
Figure 6:
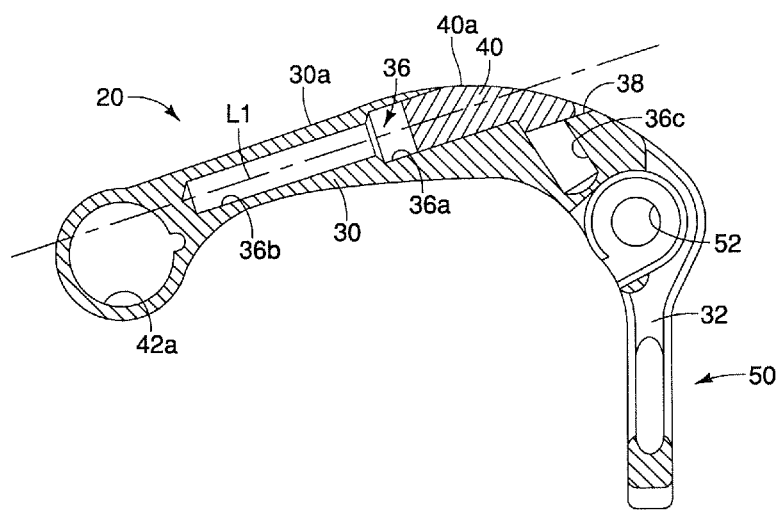
FIG. 6 is a cross-sectional view, similar to FIG. 5, of the bicycle brake arm that is illustrated in FIGS. 3 to 5, but with the cap or plug (e.g., a solid block) installed in the interior cavity of the bicycle brake arm.

As seen in FIGS. 1 to 6, the first brake arm 20 includes a first branch 30 and a second branch 32 extending from the first branch 30. As seen in FIGS. 4 to 6, the first branch 30 also has an interior cavity 36 that extends along a longitudinal direction L1 of the first branch 30. As seen in FIG. 4, the first branch 30 has a transverse cross-section in which the interior cavity 36 is completely and continuously surrounded by an exterior surface 30a of the first branch 30. As seen in FIGS. 5 and 6, the first branch 30 further has an opening 38 formed in the exterior surface 30a of the first branch 30. The opening 38 communicates with the interior cavity 36. In the illustrated embodiment, the interior cavity 36 and the opening 38 can be formed in a single drilling operation, or can be formed in two separate drilling operations. In the illustrated, the interior cavity 36 has a step configuration with a first cylindrical section 36a and a second cylindrical section 36b. The first cylindrical section 36a has a diameter that is larger than a diameter of the second cylindrical section 36b. The first and second cylindrical sections 36a and 36b are concentrically arranged with respect to the longitudinal direction L1 of the first branch 30. In the illustrated, the interior cavity 36 also has a third cylindrical section 36c that is angled relative to the first and second cylindrical sections 36a and 36b. The third cylindrical section 36c is formed in a drilling operation that occurs after the drilling operation(s) to form the first and second cylindrical sections 36a and 36b. Of course, it will be apparent to those skilled in the bicycle field from this disclosure that the third cylindrical section 36c can be formed prior to the first and second cylindrical sections 36a and 36b, as needed and/or desired.

As seen in FIGS. 4 to 6, the first brake arm 20 is provided with a cap or plug 40 that closes the opening 38 in the exterior surface 30a of the first branch 30 that communicates with the interior cavity 36. The cap 40 has an exterior surface 40a that meets with the exterior surface 30a of the first brake arm 20 in a continuously manner. In the illustrated embodiment, the cap 40 is a solid block, which is fitted into the opening 38. The cap 40 is a rigid member that is formed of a suitable material such as a metallic material or a fiber reinforced plastic material. The cap 40 is bond to the first brake arm 20. For example, if the first brake arm 20 and the cap 40 are both metallic members, then the cap 40 can be bonded to the first brake arm 20 by welding or brazing. Alternatively, the cap 40 can be adhesively bonded to the first brake arm 20 with a suitable adhesive. With the cap 40 fitted into the opening 38, the interior cavity 38 is completely and continuously surrounded by the exterior surfaces 30a and 40a. In other words, the interior cavity 38 does not communicate with an area outside of the first brake arm 20 once the cap 40 is fitted into the opening 38.

Referring back to FIGS. 1 and 2, the first branch 30 of the first brake arm 20 includes a first cable attachment structure 42 that is located at the free end of the first branch 30. The first cable attachment structure 42 has a quick release cable clamp 44 movably mounted in an opening 42a formed in the first branch 30 of the first brake arm 20 in a conventional manner. The quick release cable clamp 48 fixes an inner wire cable 46 of a brake cable to the free end of the first branch 30 of the first brake arm 20 for pulling and releasing the inner wire cable 46 of the brake cable relative to an outer casing 48 of the brake cable.

The second branch 32 of the first brake arm 20 includes a first brake shoe attachment structure 50 that is located at the free end of the second branch 32. The second branch 32 of the first brake arm 20 also includes a mounting arm attachment hole 52 for pivotally attaching the mounting arm 24 by the support bolt 26 in a conventional manner. The first brake shoe attachment structure 50 has a brake shoe mounting slot 50a that supports a brake shoe assembly 54. The brake shoe assembly 54 is a conventional structure that basically includes a shoe holder 56, a brake shoe 58 and a holder mounting bolt 60. The brake shoe 58 is detachably mounted to the shoe holder 56. The holder mounting bolt 60 is passed through the brake shoe mounting slot 50a, and is threaded into a flat stop nut that is positioned inside the shoe holder 56. The shoe holder 56 is a member made from an aluminum alloy. The brake shoe 58 is a member made of rubber that extends in the peripheral direction of the rim 18.

Now the second brake arm 22 will be briefly discussed with reference to FIGS. 1 and 2. The second brake arm 22 includes a first branch 61, a second branch 62 and a third branch 634. The first branch 60 of the second brake arm 22 is pivotally supported on the mounting bolt 16. In particular, the first branch 61 includes a mounting hole 66 for pivotally attaching the second brake arm 22 to the bicycle fork 14 by the mounting bolt 16 in a conventional manner. The second branch 62 of the second brake arm 22 includes a second cable attachment structure 68 that is located at the free end of the second branch 62. The second cable attachment structure 68 includes a support opening 68a that supports a cable adjusting bolt unit 70. The cable adjusting bolt unit 70 is a conventional structure that contacts the outer casing 48 of the brake cable. The third branch 63 of the second brake arm 22 includes a second brake shoe attachment structure 72 that is located at the free end of the third branch 64. The second brake shoe attachment structure 72 has a brake shoe mounting slot 72a that supports a brake shoe assembly 74. The brake shoe assembly 74 is a conventional structure that basically includes a shoe holder 76, a brake shoe 78 and a holder mounting bolt 80. The brake shoe 78 is detachably mounted to the shoe holder 76. The holder mounting bolt 80 is passed through the brake shoe mounting slot 72a that is formed in the third branch 64 of the second brake arm 22 includes, and is threaded into a flat stop nut that is positioned inside the shoe holder 76. The shoe holder 66 is a member made from an aluminum alloy. The brake shoe 68 is a member made of rubber that extends in the peripheral direction of the rim 18.

Now the mounting arm 24 will be briefly discussed with reference to FIGS. 1 and 2. The mounting arm 24 includes a first mounting hole 82 at one end and a second mounting hole 84 at the other end. The mounting bolt 16 extends through the first mounting hole 82 such that the mounting arm 24 is pivotally supported on the mounting bolt 16. The support bolt 26 extends through the second mounting hole 84 such that the mounting arm 24 is pivotally supported on the support bolt 26, which threads into the mounting arm attachment hole 52 of the first brake arm 20. The first and second brake arms 20 and 22 are energized toward the brake release side (the direction in which the first and second brake arms 20 and 22 are opened) by the spring 28, which has one end of the spring 28 contacting the second brake arm 22 and the other end of the spring 28 contacting the mounting arm 24.

As shown in FIG. 2, the bicycle brake device 12 is installed on the bicycle frame 14 such that the bicycle brake device 12 straddles the rim 18 of the front wheel. More specifically, the bicycle brake device 12 is positioned such that brake shoes 58 and 78 are located proximate opposing sides of the rim 18 of the front wheel. With the bicycle brake device 12 structured in this manner, when the inner wire cable 46 of the brake cable is pulled by a brake lever provided to a handlebar of the bicycle 10, the first and second brake arms 20 and 22 swing toward the rim 18, the brake shoes 58 and 78 are pressed against the rim 18, and a braking force is thereby applied. When the brake lever is returned to its original position, the first and second brake arms 20 and 22 are swung to the other side (the brake release side) by the springs 28, and the braking force is released from the rim 18. With this bicycle brake device 12, the first brake arm 20 pivots around different pivot axis A2 and the second brake arm 22 pivots around pivot axis A1 such that a uniform and powerful braking force is obtained at the left and right brake shoes 58 and 78.

Figure 7:
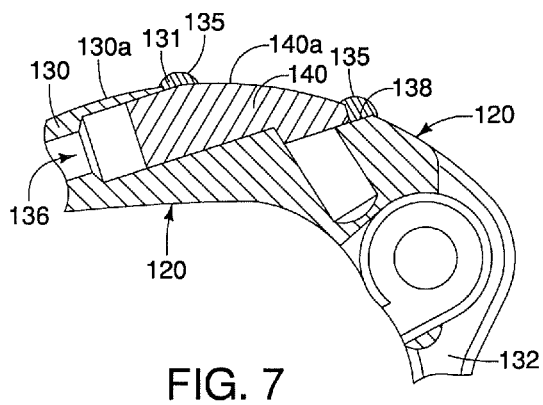
FIG. 7 is an enlarged partial cross-sectional view of a modified bicycle brake arm having the cap or plug (e.g., a solid block) bond to the bicycle brake arm by a bonding material (e.g., a metal weld)
Figure 8:
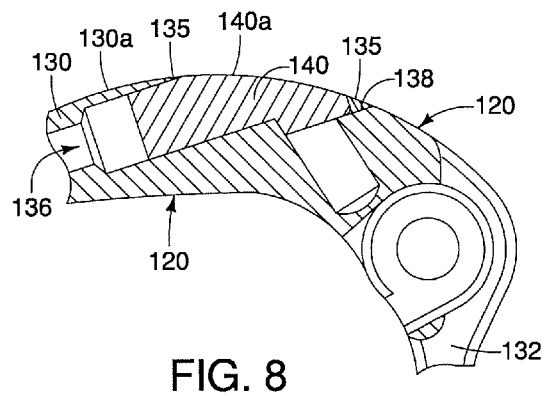
FIG. 8 is an enlarged partial cross-sectional view, similar to FIG. 5, of the modified bicycle brake arm but after surface treating the bonding material to form a seamless connection between the exterior surfaces of the cap and the bicycle brake arm.

Referring now to FIGS. 7 and 8, a modified first brake arm 120 is illustrated in accordance with another illustrated embodiment. The first brake arm 120 replaces the first brake arm 20 in the bicycle brake device 12 of FIGS. 1 and 2. Similar to the first brake arm 20, the first brake arm 120 includes a first branch 130 and a second branch 132 extending from the first branch 130. Also the first brake arm 120 includes an interior cavity 136 with an opening 138 formed in an exterior surface 130a of the first branch 130. The first brake arm 20 is provided with a cap or plug 140 that closes the opening 138 in the exterior surface 130a of the first branch 130 that communicates with the interior cavity 136.

Here, in this alternate embodiment, the first brake arm 120 is identical to the first brake arm 20, except that the opening 138 is configured such that the exterior surface 130a of the first branch 130 meets with the cap 140 to define a groove 131 that surrounds the cap 140 between the exterior surfaces 130a and 140a. The groove 131 is continuously provided around the cap 140 for receiving a bonding material 135 (e.g., a metal weld). As seen in FIG. 8, a mechanical surface treatment (e.g., a milling process) is applied to the bonding material 135 to form a seamless connection between the exterior surface 130a of the bicycle brake arm 120 and an exterior surface 140a of the cap 140. In this way, the connection between the exterior surface 130a of the bicycle brake arm 120 and the exterior surface 140a of the cap 140 is invisible to a naked eye. Thus, a smooth exterior surface is formed between the exterior surface 130a of the bicycle brake arm 120 and the exterior surface 140a of the cap 140.

Figure 9:
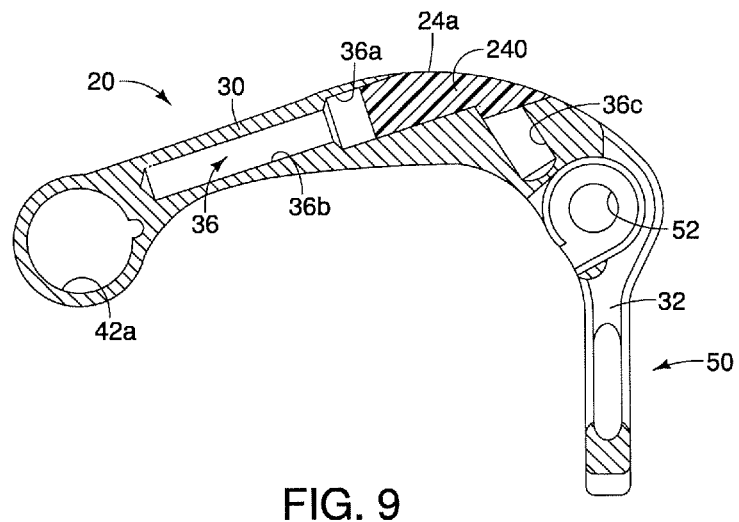
FIG. 9 is a cross-sectional view, similar to FIG. 5, of a bicycle brake arm that is illustrated in FIGS. 3 and 4, but which is provided with a cap or plug that is formed of a harden putty filler accordance with another illustrated embodiment.

Referring now to FIG. 9, the first brake arm 20 of the bicycle brake device 12 is provided with alternative cap 240. The cap 240 is a harden putty filler, which is initial soft and pliable so that the filler material can be filled into the opening 38 and then subsequently harden. In other words, for example, an epoxy or other filler material is filled into the interior cavity 36 at the opening 38. The epoxy or other filler material will then subsequently harden in the interior cavity 36 to seal off the opening 38. The cap 240 has an exterior surface 240a that meets with the exterior surface 30a of the first branch 30 to form a seamless connection between the exterior surface 30a of the bicycle brake arm 20 and the exterior surface 240a of the cap 240. The filler material forming the cap 240 can be subjected to a mechanical surface treatment (e.g., a milling process) before and/or after the filler material of the cap 240 hardens such that the connection between the exterior surface 30a of the bicycle brake arm 20 and the exterior surface 240a of the cap 240 is invisible to a naked eye. Thus, a smooth exterior surface is formed between the exterior surface 30a of the bicycle brake arm 20 and the exterior surface 240a of the cap 240.

With the first brake arms 20 and 120, a weight reduction of approximately ten percent or slightly more can be attained with the first brake arm 20 or 120 being provided with the interior cavity 36 or 136 as compared to a solid brake arm having an identical shape but without the interior cavity 36 or 136. For example, in a case where the first brake arm 20 is a cold-forged aluminum arm with an aluminum cap, the first brake arm 20 weights 29 grams as compared to 32 grams for a solid brake arm of the same shape and material. By making the cap out of a lighter weight material further weight reduction may be possible. Also if a cap is not used, then further weight reduction may be possible.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise specified. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle brake device on a horizontal surface in the upright position unless otherwise specified. Accordingly, these terms, as utilized to describe the bicycle brake device should be interpreted relative to a bicycle equipped with the bicycle brake device as used in the normal riding position unless otherwise specified. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the bicycle brake arm can also be applied to a brake arm in a cantilever brake or another type of rim brake instead of a caliper brake. For example, the size, shape, location or orientation of the various components can be changed as needed and/or desired. Components that are shown directly connected or contacting each other can have intermediate structures disposed between them unless otherwise specified. Thus, the foregoing descriptions of the embodiments according to the present invention are provided for illustration only, and not for the purpose of limiting the invention as defined by the appended claims and their equivalents.

What is claimed is:
1. A bicycle brake arm comprising:
an exterior surface; and
an interior cavity extending in a longitudinal direction, and the bicycle brake arm having a cross-section transverse to the longitudinal direction at the interior cavity in which the interior cavity is completely and continuously surrounded by the exterior surface, the exterior surface being a continuous, uninterrupted surface, and the brake arm being formed from a single member at the cross-section.

2. A bicycle brake arm comprising:
a first branch including a cable attachment structure; and
a second branch extending from the first branch, the second branch including a brake shoe attachment structure,
at least one of the first and second branches including an exterior surface and an interior cavity extending in a longitudinal direction, the at least one of the first and second branches having a cross-section transverse to the longitudinal direction at the interior cavity in which the interior cavity is completely and continuously surrounded by the exterior surface of the bicycle brake arm, the exterior surface being a continuous, uninterrupted surface, and the brake arm being formed from a single member at the cross-section.

3. The bicycle brake arm according to claim 2, wherein the interior cavity has an opening formed in the exterior surface of the bicycle brake arm.

4. The bicycle brake arm according to claim 3, further comprising
a cap that closes the opening in the exterior surface that communicates with the interior cavity.

5. The bicycle brake arm according to claim 4, wherein the cap has an exterior surface that seamlessly meets with the exterior surface of the bicycle brake arm in a continuous manner.

6. The bicycle brake arm according to claim 5, wherein the cap is a block which is fitted into the opening.

7. The bicycle brake arm according to claim 5, wherein the cap is a harden putty filler which is filled in the opening.

8. The bicycle brake arm according to claim 2, wherein the interior cavity has a cylindrical shape which extends along the longitudinal direction of the at least one of the first and second branches of the bicycle brake arm.

9. The bicycle brake arm according to claim 8, wherein the interior cavity has an opening formed in the exterior surface of the bicycle brake arm.

10. The bicycle brake arm according to claim 9, further comprising
a cap that closes the opening in the exterior surface that communicates with the interior cavity.

11. The bicycle brake arm according to claim 10, wherein the cap has an exterior surface that seamlessly meets with the exterior surface of the bicycle brake arm in a continuous manner.

12. The bicycle brake arm according to claim 10, wherein the cap is a block which is fitted into the opening.

13. The bicycle brake arm according to claim 10, wherein the cap is a harden putty filler which is filled in the opening.

14. A bicycle brake device comprising:
a first brake arm including a first brake shoe attachment structure and a first cable attachment structure, the first brake arm including at least one interior cavity; and
a second brake arm including a second brake shoe attachment structure and a second cable attachment structure, the first and second brake arms being pivotally supported relative to each other,
the first brake arm including an exterior surface and an interior cavity extending in a longitudinal direction, and having a cross-section transverse to the longitudinal direction at the interior cavity in which the interior cavity is completely and continuously surrounded by the exterior surface, the exterior surface being a continuous, uninterrupted surface, and the brake arm being formed from a single member at the cross-section.

15. The bicycle brake device according to claim 14, wherein
the first brake arm includes a first branch having the first cable attachment structure, and a second branch having the first brake shoe attachment structure, at least one of the first and second branches including the interior cavity.

16. The bicycle brake arm according to claim 14, wherein the interior cavity has an opening formed in the exterior surface of the bicycle brake arm.

17. The bicycle brake arm according to claim 16, further comprising
a cap that closes the opening in the exterior surface that communicates with the interior cavity.

18. The bicycle brake arm according to claim 16, wherein the cap is a block which is fitted into the opening.

19. The bicycle brake arm according to claim 16, wherein the cap is a harden putty filler which is filled in the opening.

20. The bicycle brake atm according to claim 14, wherein the interior cavity has a cylindrical shape which extends along the longitudinal direction of the first brake arm.

* * * * *